Feb. 5, 1963 R. S. DAVIDSON, JR 3,076,947

LOW PASS FILTER

Filed Nov. 1, 1960 2 Sheets-Sheet 1

INVENTOR.
RICHARD S. DAVIDSON JR.,
BY
Walter J. Adam
ATTORNEY.

Feb. 5, 1963 R. S. DAVIDSON, JR 3,076,947

LOW PASS FILTER

Filed Nov. 1, 1960 2 Sheets-Sheet 2

INVENTOR.
RICHARD S. DAVIDSON JR.,
BY
Walter J. Adam
ATTORNEY

United States Patent Office 3,076,947
Patented Feb. 5, 1963

3,076,947
LOW PASS FILTER

Richard S. Davidson, Jr., Redondo Beach, Calif., assignor to Hughes Aircraft Company, Culver City, Calif., a corporation of Delaware Filed Nov. 1, 1960, Ser. No. 66,580
3 Claims. (Cl. 333—79)

This invention relates to filters and particularly to a miniature low pass filter that has a relatively low cutoff frequency and provides a relatively large and consistent attenuation over a wide frequency range.

One arrangement to accomplish low pass filtering is with a standard $\pi$ section filter. However, a conventional $\pi$ section involves separate inductive and capacitive components with interconnecting wiring which increases the size of the filter package. Another factor contributing to the requirement of large filter packages is the conventional use of toroid shaped cores in the inductor. Also, the interconnecting wiring may contribute reactive characteristics which causes the filter to provide a relatively small attenuation of signals at high frequencies. Undesirable distributed capacitance is inherently developed in the inductive coil so that a relatively low impedance is presented to high frequency components of the filtered signal. Also, series inductance is inherently developed in the wiring connecting the capacitance elements to a reference potential so that the attenuation charactistics are limited at higher frequencies above the pass band.

The volume and weight of filter units are major factors in such equipment as compact computer units or aircraft flight control systems. This is particularly true in connection with low pass filter units requiring a relatively low cutoff frequency and improved attenuation characteristics in response to high frequency signals which conventionally have been provided with relatively large volume and weight.

It is thus an object of this invention to provide an improved miniature low pass filter requiring a greatly reduced volume while maintaining performance characteristics.

It is a further object of this invention to provide an improved compact and easily mounted low pass filter having relatively large capacitance and inductance values with the filter having minimum overall dimensions.

It is a still further object of this invention to provide an improved, easily constructed low pass filter which exhibits a relatively large uniform insertion loss over a wide range of frequencies above the pass band.

Briefly, in accordance with this invention, two disc type capacitors and an inductor are mounted in a hollow cylindrical cause to form a $\pi$ network. The disc capacitors each have a first plate attached directly to the case with the second plates attached to terminals in a feedthrough arrangement. By attaching the first plates directly to the case, a maximum capacitance is provided with a minimum of undesired series inductance between the capacitor and the case. Mounted between the capacitors are two cylindrical shaped ferromagnetic cores having an annular groove therein. An inductor coil arranged to minimize distributed capacitance is disposed in the annular groove and electrically coupled between the second plates of the capacitors. Because of the selection and arrangement of elements, the filter has a minimum of dimensions, provides a low cutoff frequency and provides improved insertion loss characteristics.

The novel features of this invention, as well as the invention itself, both as to its organization and method of operation, will best be understood from the accompanying description taken in connection with the accompanying drawings in which like characters refer to like parts and in which.

Figure 1:
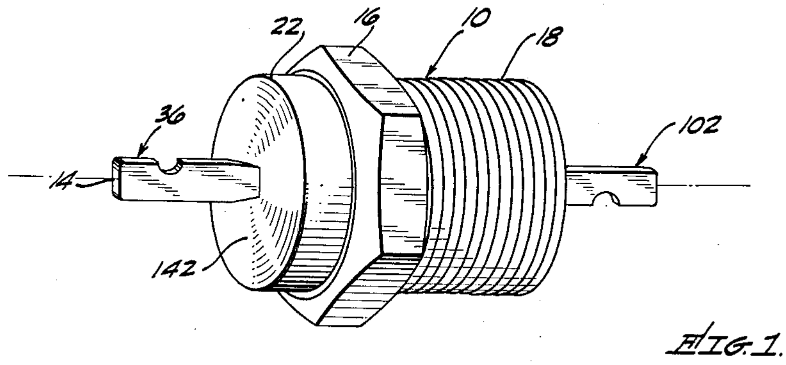
FIG. 1 is an external view of the highly compact low pass filter in accordance with this invention.
Figure 2:
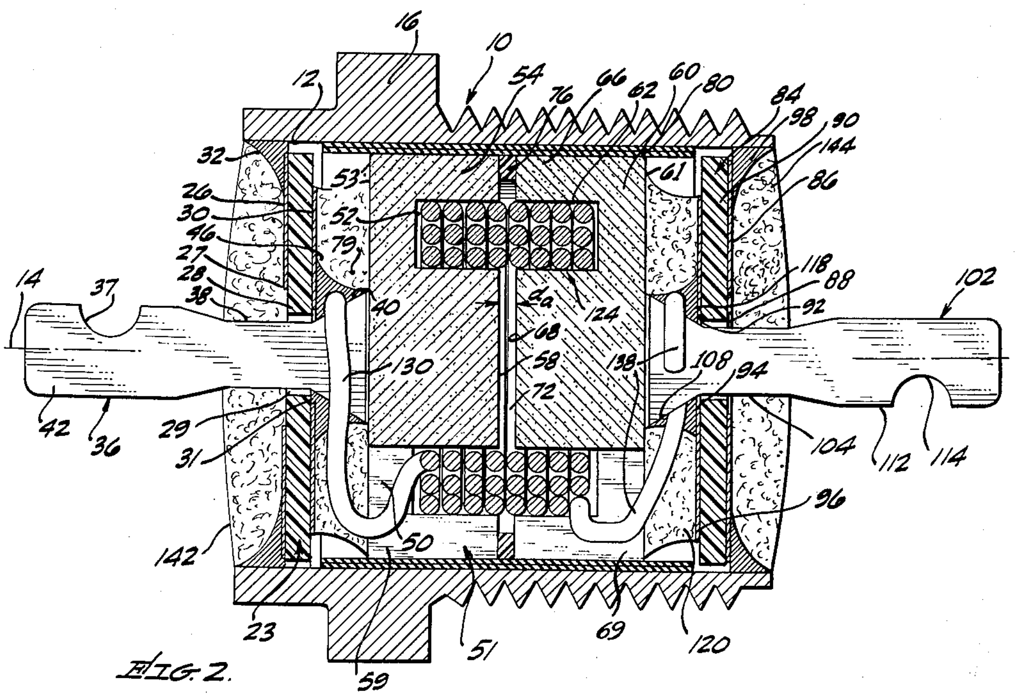
FIG. 2 is a sectional side view showing the construction of the low pass filter of FIG. 1.

Referring to the external view of FIG. 1 and to the sectional view of FIG. 2, the low pass filter includes a tubular mounting case 10 having an annular inner surface 12 centered on a longitudinal axis 14. Externally the mounting case 10 has a hexagonal flange 16 extending radially outward from the body of the tubular case 10 and has one end threaded as at 18 and the other end having a smooth surface as at 22. It is to be noted that other external arrangements of the case 10 may be utilized in accordance with this invention. The case 10 may be of brass material plated with silver or gold so as to provide a reliable ground connection to equipment structure (not shown). At one axial end of the case 10 a first capacitor 23 is provided with an annular plate 26 of a conductive material and having a centrally disposed annular opening 27, an annular plate 28 of a dielectric material and having a centrally disposed annular opening 29 and an annular plate 30 having a centrally disposed annular opening 31. The external diameter of the plate 26 is slightly less than the internal diameter of the surface 12 so as to be easily assembled and attached or sweated thereto such as by an annular ring of solder 32 which provides direct connection to the case 10. The annular plate 30 has an external diameter substantially less than that of the surface 12 so as to be electrically isolated therefrom. The external diameter of the plate 28 is the same as that of plate 26, and the thickness of the plate 28 along the axis 14 is determined by the required voltage capability. The plates 26 and 30 may be of a suitable conductive material such as silver being vacuum deposited on the dielectric plate 28. A suitable dielectric material such as a ceramic type material having a high dielectric constant may be utilized for the plate 28.

Projecting through the annular openings of the plates 26, 28 and 30 in a feedthrough arrangement is a first connecting terminal 36 which may have a central portion 38 of a first diameter increasing at one end as shown at 40 and being flattened at the other end to a strip at 42 which may include a semicircular notch 37 for ease of providing an electrical connection. The surface at 40 is electrically connected to the plate 30 such as by an annular solder ring 46.

A first core 50 of an inductor 51 is provided, being formed from a cylindrical body with a flat surface 53 at one axial end and an annular groove 52 at the other axial end to form an external ring 54 and a central post or projection 58. As may be seen in FIG. 3 a narrow opening or slot 59 is provided in the core 50 extending from the annular groove 52 through the external ring 54. Also a similar second core 60 is provided, being formed from a cylindrical body with a flat surface 61 at one axial end and an annular groove 62 at the other axial end to form an external ring 66 and a central post or projection 68. A slot 69 (FIG. 3) is provided in the core 60 extending from the annular groove 62 through the external ring 66 for a small distance around the circumference thereof. The first core 50 has the flat surface 53 disposed adjacent to the end 40 of the first terminal 36 separated therefrom by a thin film of potting material of an annular ring 79 and has the central post 58 adjacent and concentric to the post 68 of the second core 60 but separated by a space 72.

The space 72 may include a potting material having a permeability $\mu$ substantially similar to that of air so as to provide a desired overall permeability to the core material with a selected saturation value. The surfaces 53 and 68 are maintained with the desired separation distance $d_a$ by a spacing ring 76 which may be of a Teflon material, for example, also having dielectric constant similar to air. The annular mass of potting material 79 protects the capacitor 23 and core 50 from forces applied to the end 42 of the first terminal 36. The cores 50 and 60 are thus centered on the axis 14 and intermediate between the two axial ends of the case 10. An electrical insulating tape 80 is disposed around the cores 50 and 60 so as to provide electrical isolation of the inductor 51 from the case 10.

At the axial end of the case 10 opposite to the capacitor 23, a capacitor 84 which is similar to the capacitor 23 is provided with an annular plate 86 of a conductive material having a centrally disposed annular opening 88, an annular plate 90 of a dielectric material having a centrally disposed annular opening 92 and an annular plate 96 having a centrally disposed annular opening 94. The plate 86 is adjacent to the external flat surface of the plate 90 and the plate 96 is adjacent to the inward surface along the axis 14 of the plate 90, the plates 86 and 96 being, for example, deposited silver similar to the plates of the capacitor 23. The external diameter of the plate 86 is slightly less than the internal diameter of the surface 12 so as to be easily assembled and attached or sweated thereto such as by an annular ring of solder 98. The annular plate 90 has substantially the same external diameter as the annular plate 86 and the annular plate 96 has an external diameter substantially less than the internal diameter of the surface 12 so as to be electrically isolated therefrom. Similar to the capacitor 23, the axial thickness of the plate 90 is determined by the required voltage capability of the capacitor.

Projecting through the annular openings 88, 92 and 94 of the capacitor 84 in a feedthrough arrangement is a second terminal 102 which may have a central portion 104 and an enlarged end 108 having an expanded conical shape. The other end of the terminal 102 may be flattened to a strip at 112 with a circular notch 114 for ease of providing an electrical connection thereto. The end 108 of the terminal 102 is electrically connected to the annular plate 96 such as by an annular ring of solder 118. The annular surface at the end 108 of the terminal 102 is disposed adjacent to the surface 61 of the core 60 being separated therefrom by a thin layer of potting material. An annular mass 120 is disposed around the annular ring of solder 118 to protect the capacitor 84 from forces applied to the external portion 112 of the terminal 102.

Figures 3, 4:
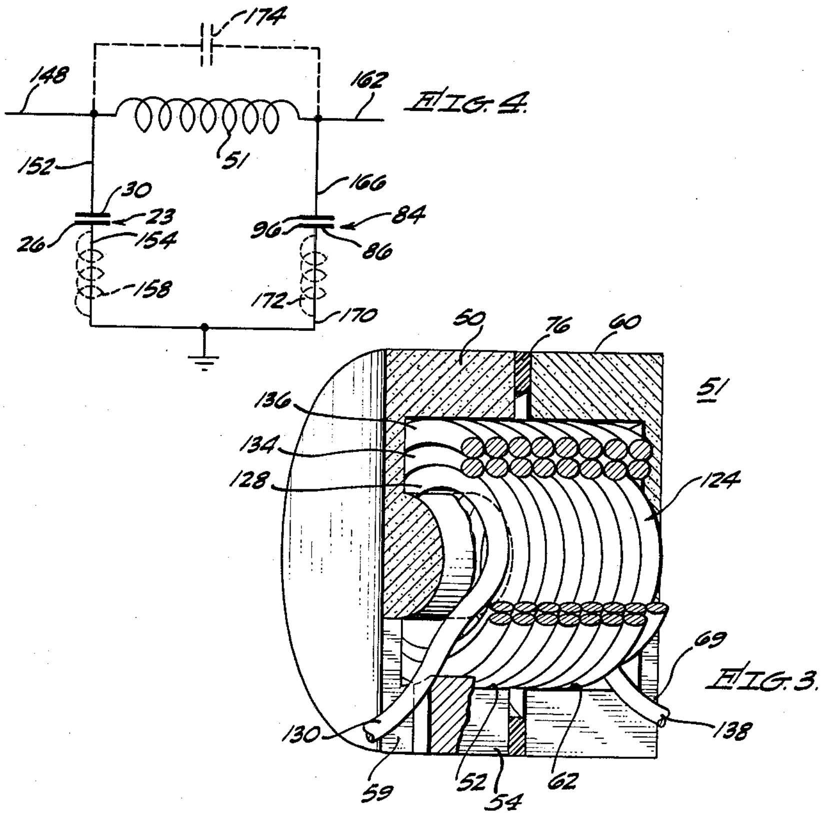
FIG. 3 is a perspective drawing showing in greater detail the inductor portion of the filter of FIGS. 1 and 2.
FIG. 4 is a schematic diagram of the $\pi$ section formed by the filter of FIGS. 1 and 2.

Referring now also to FIG. 3, a coil 124 is disposed within the annular grooves 52 and 62 of the cores 50 and 60 to provide the inductor 51 of the $\pi$ section in accordance with this invention. The coil 124 may have an internal winding or layer 128 with one end 130 of the coil 124 passing through the slot 59 to encircle a portion of the enlarged end 40 of the terminal 36. The end 130 is electrically connected to the terminal 36 as well as to the plate 30 by the annular ring of solder 46. The wire of layer 128 continues from the layer 128 through an intermediate layer 134 to an external layer 136 and to an end 138 which is passed through the slot 69 and partially wrapped around the enlarged end 108 of the terminal 102. The end 138 is electrically connected to the terminal 102 as well as to the plate 96 by the annular ring of solder 118. The coil 124 has an odd number of layers so as to minimize stray capacitance across the $\pi$ section inductance. It is to be noted that the coil 124 may have any desired number of layers preferably an odd number for developing a minimum distributed or stray capacitance. The wire of the coil 124 may be insulated by a varnish coating but is not isolated from the cores 50 and 60 by a separate structure as in conventional inductors. The insulating tape 80 provides electrical isolation of the inductor 51 from the case 10 where the varnish coating is accidentally broken or removed adjacent to the cores 50 and 60. By utilizing the insulation tape 50 to isolate the inductor 51, a larger coil 124 may be disposed in the annular slots 52 and 62.

In order to seal the filter from external moisture, annular masses 142 and 144 of a suitable potting material such as epoxy is disposed at the first and second axial ends of the case 10 around the respective terminals 36 and 102.

Now that the assembled arrangement of the miniature $\pi$ section filter has been explained in accordance with this invention, the assembly procedure thereof will be discussed. For assembling the inductor 51 the coils 50 and 60 with a small quantity of adhesive film placed on the ends of the posts 58 and 68 are firmly and concentrically forced together against the ring spacer 76 with the coil 124 positioned in the annular grooves 52 and 62 and with the coil ends 130 and 138 extending through the respective slots 59 and 69. When sufficient pressure is applied to the cores 50 and 60 so that the spacer 76 is firmly clamped therebetween, the assembled inductor 51 of FIG. 3 is cured. For example, when the adhesive in the space 72 is epoxylite No. 6203, the inductor 51 is cured for approximately two hours at 200° F. After this curing operation is completed, two to four turns of electrical tape such as Scotch No. 56 are applied around the cores 50 and 60 to form the insulating strip 80. The insulating strip 80 extends axially beyond the surfaces 51 and 61 to insure that the ends 130 and 138 of the coil 124 are electrically isolated from the case 10. The next step in the assembly is to form the capacitors 23 and 84 such as by depositing silver through screens onto the dielectric plates 28 and 90 and to insert the respective terminals 36 and 102 through the central axial openings thereof. The capacitors 23 and 84 are then brought into position adjacent to the inductor 51 and respectively soldered to the coil ends 130 and 138 with the annular solder rings 46 and 118. It is to be noted that preferably the leads 130 and 138 are wound around the respective terminals 36 and 102 at least 270 angular degrees to provide the most desirable electrical connection. The next step in the assembly is to apply the annular masses of potting material 79 and 120 around the solder rings 46 and 118. The capacitors 23 and 84 are then moved into the position concentric with the cores 50 and 60 by bending the ends 130 and 138 of the coil 124 so that the mass of potting material 79 and 120 is abutting the surfaces 53 and 61 of the cores 50 and 60 and forming a thin layer at the ends 40 and 108 of the terminals 36 and 102. This subassembly is then firmly clamped in position while being again cured similar to that as discussed above. The final step in the assembly of the filter is to insert the subassembly including the cores 50 and 60 into position within case 10 and respectively soldering the external edge of the annular plates 26 and 86 of the capacitors 23 and 84 to the internal surface 12 by annular solder rings 32 and 98. The annular masses of potting material 142 and 144 are then caused to flow into the two axial ends of the case 10 with the final assembly filter being again cured as discussed above to provide the completed filter of FIGS. 1 and 2.

Figure 5:
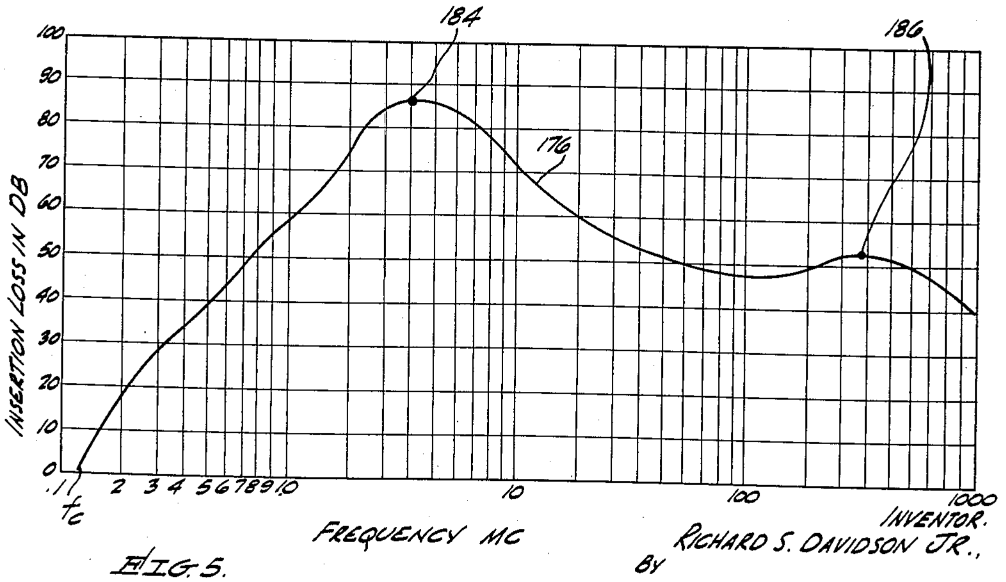
FIG. 5 is a graph of frequency versus insertion loss for explaining the improved operating characteristics of the filter of FIGS. 1 and 2.

Referring now to the $\pi$ section low pass filter circuit of FIG. 4 and to the insertion loss versus frequency curve of FIG. 5 as well as to FIG. 2, an input lead 148 which may be representative of the first terminal 36 is coupled to one end of the inductor 51 representative of the inductance developed by the coil 124 and the cores 50 and 60. The lead 148 is also coupled through a lead 152 to the plate 30 of the capacitor 23 which lead represents the annular solder ring 46. The plate 26 is coupled to ground, that is, to the case 10 through a lead 154 which coupling represents the annular solder ring 32 in FIG. 2. A series inductance 158 is shown dotted in the lead 154 which represents the conventional self inductance of a wire lead but, because of the direct connection of the annular solder ring 32, has a relatively small value in the filter in accordance with this invention. The other end of the inductor 51 is coupled to an output lead 162 which may represent the second terminal 102. The second end of the inductor 51 is coupled through a lead 166 to the plate 96 of the capacitor 84 which lead represents the annular solder ring 118. The plate 86 is coupled through a lead 170 to ground representative of the annular solder ring 98 to the case 10. A series inductor 172 is shown dotted in the lead 170 to represent the conventional self or mutual inductance developed in a wire but which is greatly minimized by the direct connection of the solder ring 98. Coupled across the inductor 51 is a capacitor 174 shown dotted to indicate the distributed capacitance developed across the coil 124, which may be greatly minimized in accordance with this invention by utilizing the coil 124 with an odd number of layers.

A curve 176 of FIG. 5 shows the operating characteristics of the filter in accordance with this invention for $L=1270$ microhenries for inductor 51, $C=11{,}200$ micromicrofarads for capacitors 23 and 84 and having a 50 milliampere D.C. (direct current) capability. For this filter with a relatively low D.C. capability the spacing ring 76 is not utilized and the distance $d_a$ is essentially zero. The insertion loss is proportional to the voltage amplitude developed across a selected load in a test circuit without the filter to the voltage amplitude developed across the load with the filter in the test circuit. The curve 176 rises from a cutoff frequency $f_c$ with a steep slope of approximately 20 decibels per octave to a first resonant point 184 having an insertion loss amplitude which is determined by the frequency of parallel resonance of the inductor 51 and distributed capacitance 174. By providing an odd number of windings to the core 124 so that the ends 130 and 138 are at opposite ends of the coil 124 to provide a minimum value to the stray capacitance 174, the resonant point 184 rises to a relatively high frequency with a relatively high insertion loss. As is well known, a substantially large portion of the stray or distributed capacitance in a coil may be developed between the input and output leads. Also, by reducing the distributed capacitance 174 which is essentially a short circuit at high frequencies, the insertion loss curve 176 is maintained at a relatively high value of insertion loss at high frequencies to the right of point 184. Thus, the low value of the distributed capacitance 174 provides the filter with improved attenuation characteristics.

The cutoff frequency $f_c$ is relatively low because of the relatively large values of capacitance and inductance obtained with minimum physical dimensions. The feedthrough arrangement of the capacitors 23 and 84 provides maximum surface area with the case 10 having minimum dimensions. The shape of the cores 50 and 60 with the annular slots therein provides a maximum volume of material and thus contributes to a high inductance in a small space. Also, the cores 50 and 60 are selected of a material having a high permeability $\mu$ to increase the inductance. Further, the utilization of the coil 124 without a conventional bobbin in the annular grooves 52 and 62 as a result of providing isolation at the insulating tape 80 allows more windings to be utilized in a fixed space to increase the value of the inductance without increasing the overall dimensions of the filter. It is to be noted that by utilizing all of the space in the annular grooves 52 and 62 larger wires may be provided in the coil 124 for a large D.C. current rating.

A second resonant point 186 is present on the curve 176 as a result of the series resonance of the capacitor 23 and series inductance 158 and of the capacitor 84 and series inductance 172. Because the value of the series inductance 158 and 172 is greatly reduced in the low pass filter in accordance with this invention by directly connecting the plates 26 and 96 to the case 10 by the annular solder rings 32 and 98, the second resonant point 186 occurs at a relatively high frequency. Thus, a relatively large attenuation is maintained from the frequency at point 184 to the very high frequencies. Thus, for example, the curve 176 provides a minimum attenuation of 40 decibels (db) between 0.6 mc. and greater than 1000 mc.

Another advantage of the filter of FIG. 2 is that the air space 72 effectively controls the saturation point of the cores 50 and 60 and by increasing the distance $d_a$ provides a high D.C. current rating for a relatively small core. However, low frequency attenuation is sacrificed to some extent by increasing the distance $d_a$ of the gap 72. By varying the thickness $d_a$ of the spacing ring 76, a desired D.C. current rating may be obtained without changing the external dimensions of the filter. The coil 124 may be of a wire size, for example, to operate over a range of current from 50 milliamperes to 1 ampere so as to standardize construction thereof.

As an example, filters will be considered in accordance with this invention having an internal diameter of the surface 12 of 0.391 inch and an axial length of the case 10 of 0.50 inch (overall dimensions excluding the terminals of approximately ½ inch by ½ inch). With these dimensions, filters having a 50 milliampere D.C. rating and a 1 ampere D.C. rating have been developed. The cores 50 are Ferroxcube No. 332P133 of Ferroxcube 3C material having a relatively large permeability $\mu$. The coil 124 was constructed of No. 28 varnished wire of three layers as shown in FIGS. 2 and 3. Other elements were constructed of materials in accordance with the examples discussed above. The 50 milliampere filter has a spacing distance $d_a$ of essentially zero and the 1 ampere filter had a distance $d_a$ of .005 inch. The 50 milliampere filter provided a minimum of 40 decibels insertion loss between a frequency of 0.7 mc. and 1000 mc. and had a cutoff frequency $f_c$ of approximately 130 kc. as shown in FIG. 5. The 1 ampere rated filter provided a minimum of 40 decibels insertion loss between frequencies of 1.5 mc. to 1000 mc. and had a cutoff frequency $f_c$ of 300 kc. Thus, it may be seen that for a relatively small size and at a relatively large D.C. current rating, low cutoff frequencies and a consistently high attenuation to a very high frequency is obtained with the filter in accordance with this invention. Another advantage is that the same core 124 may be utilized to develop a filter with a relatively low or high D.C. current rating by only varying the thickness $d_a$ of the space 72 and without varying the overall dimensions.

It is to be noted that the miniature filter in accordance with this invention is not limited to a particular size or value as discussed above, but may have many values and sizes.

Thus, there has been described a miniature low pass radio frequency filter which provides a low cutoff frequency by an improved inductance arrangement of a coil and cores. Because of the improved arrangement of the capacitors, a high insertion loss is maintained to a very high frequency range.

What is claimed is:

1. A low pass $\pi$ section filter comprising a cylindrical case of a conductive material for being coupled to a source of reference potential, first and second annular plates of a conductive material each having a centrally located annular opening and peripherally electrically connected to opposite axial ends of said cylindrical case, third and fourth annular plates of dielectric material having a centrally located annular opening and respectively disposed adjacent to and axially inward from said first and second plates, fifth and sixth annular plates of a conductive material having a centrally located annular opening and disposed respectively adjacent to and inward from said third and fourth plates, the periphery of said fifth and sixth plates being electrically isolated from said case, first and second cores each being a cylindrical body having a first and second axial end and having an annular groove extending inward from said first end to form an outer ring and an axial projection, said first and second cores being axially disposed between said fifth and sixth plates with the outer rings and axial projection adjacent to each other, first and second terminal means respectively projecting through the annular openings in said first and third and in said second and fourth plates and electrically connected to said respective fifth and sixth plates, a continuously wound coil having an odd number of layers of windings disposed in the annular groove of said first and second cores and coupled between said fifth and sixth plates, and electrical insulating means disposed between the circumferential external surface of said first and second cores and said cylindrical case.

2. A low pass $\pi$ section filter comprising a tubular mounting case having a longituidnal axis and an annular axial opening, first and second annular plate capacitors each having a first and second plate of a conductive material separated by a third plate of dielectric material, said capacitors having a central annular opening, said first and second capacitors disposed at opposite axial ends of said case in said annular opening with said first plates adjacent to the axial ends of said case, respective first and second annular solder rings electrically connecting the circumferential edges of said first plates to said case, first and second cores each having a cylindrical body with a longitudinal axis and a first and second axial end with an annular groove extending axially inward from said first end to form an axial center projection thereat, said first and second cores disposed axially in said annular opening in said case between said first and second capacitors with said first ends adjacent to each other, a coil having an odd number of layers of wire disposed in said annular openings of said first and second cores and having first and second ends respectively extending to said first and second capacitors, and first and second terminals respectively disposed through the annular openings in said first and second capacitors and electrically connected to said respective second plates of said first and second capacitors, and to said respective first and second ends of said coil.

3. A $\pi$ section low pass filter comprising a tubular mounting case having a longitudinal axis and an annular opening extending along said axis, first and second capacitors each including an annular plate of a dielectric material having an annular opening at the radial center thereof and first and second annular plates having an annular opening at the radial center thereof of a conductive material and attached concentrically to opposite flat sides of said annular plate of dielectric material, said first and second capacitors being disposed at respective first and second axial ends of said case, with said first plates of said first and second capacitors respectively facing the first and second ends and said first plates being electrically connected around the circumference thereof to said case, first and second cores each having a cylindrical body with a first and second end with an annular groove extending axially inward from said first axial end, said first and second cores being disposed substantially axially in said tubular case with the annular grooves of said first axial end being adjacent, each of said cores having a slot extending from said annular groove to said second end thereof, a coil having an odd number of layers of wire disposed within said annular grooves and having first and second ends passing through said slots, annular insulating means disposed around the external circumference of said first and second cores, first and second terminals inserted through the annular openings in said first and second capacitors each having one end respectively adjacent to the second axial ends of said first and second cores, electrical connecting means connecting the respective first and second ends of said coil the second plates of said respective first and second capacitors and the ends of said respective first and second terminals, and means enclosing the axial ends of said tubular case around said first and second terminals.

References Cited in the file of this patent

UNITED STATES PATENTS

| | | |
|---|---|---|
| 1,803,868 | Porter | May 5, 1931 |
| 2,728,054 | Albers-Schoenberg | Dec. 20, 1955 |
| 2,759,155 | Hakenberg | Aug. 14, 1956 |
| 2,948,871 | Craige | Aug. 9, 1960 |

FOREIGN PATENTS

| | | |
|---|---|---|
| 818,775 | Great Britain | Aug. 26, 1959 |

OTHER REFERENCES

Allen-Bradley Technical Bulletin No. 5410, January 16, 1958, 3 pages.